Patented Oct. 4, 1932

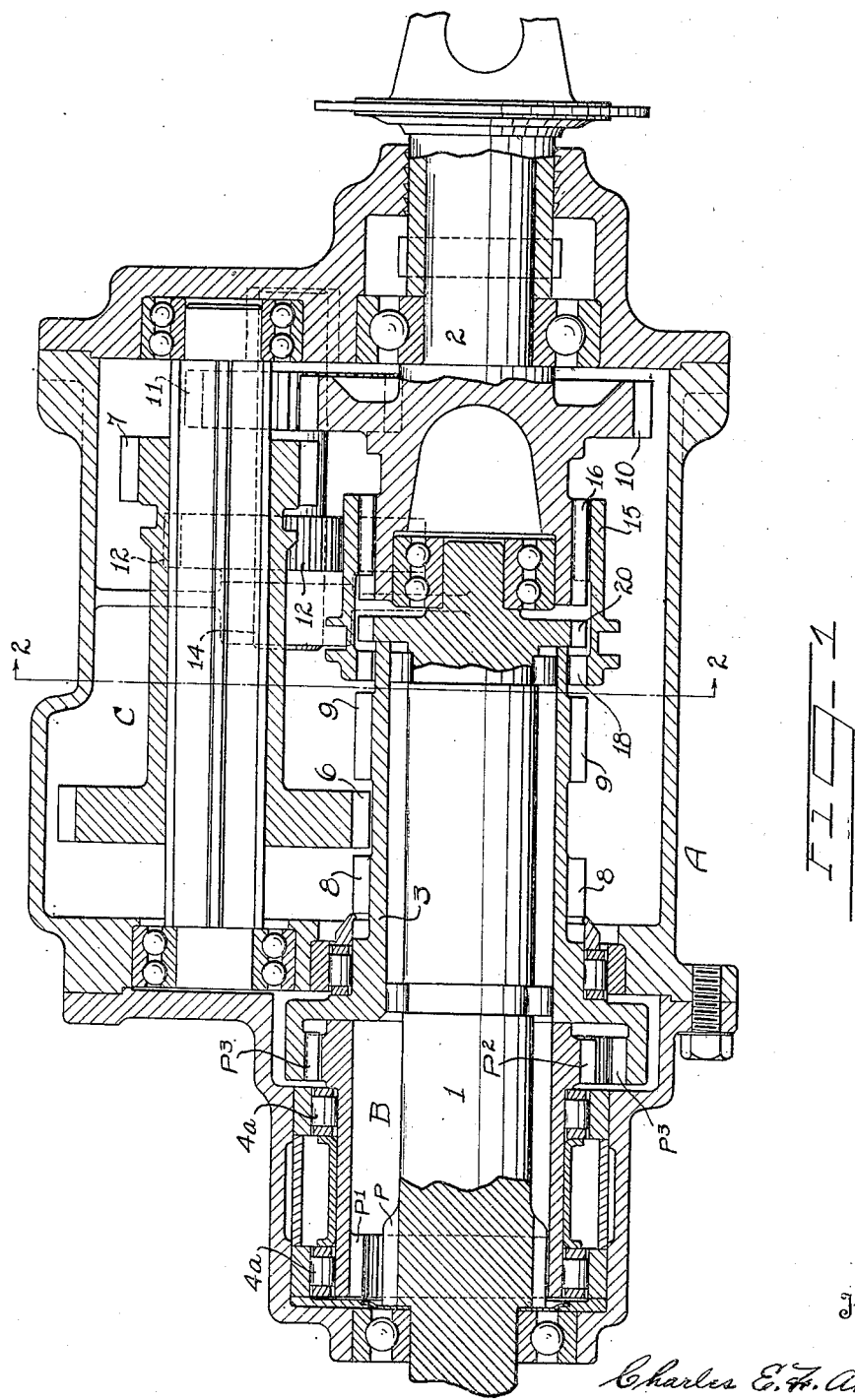

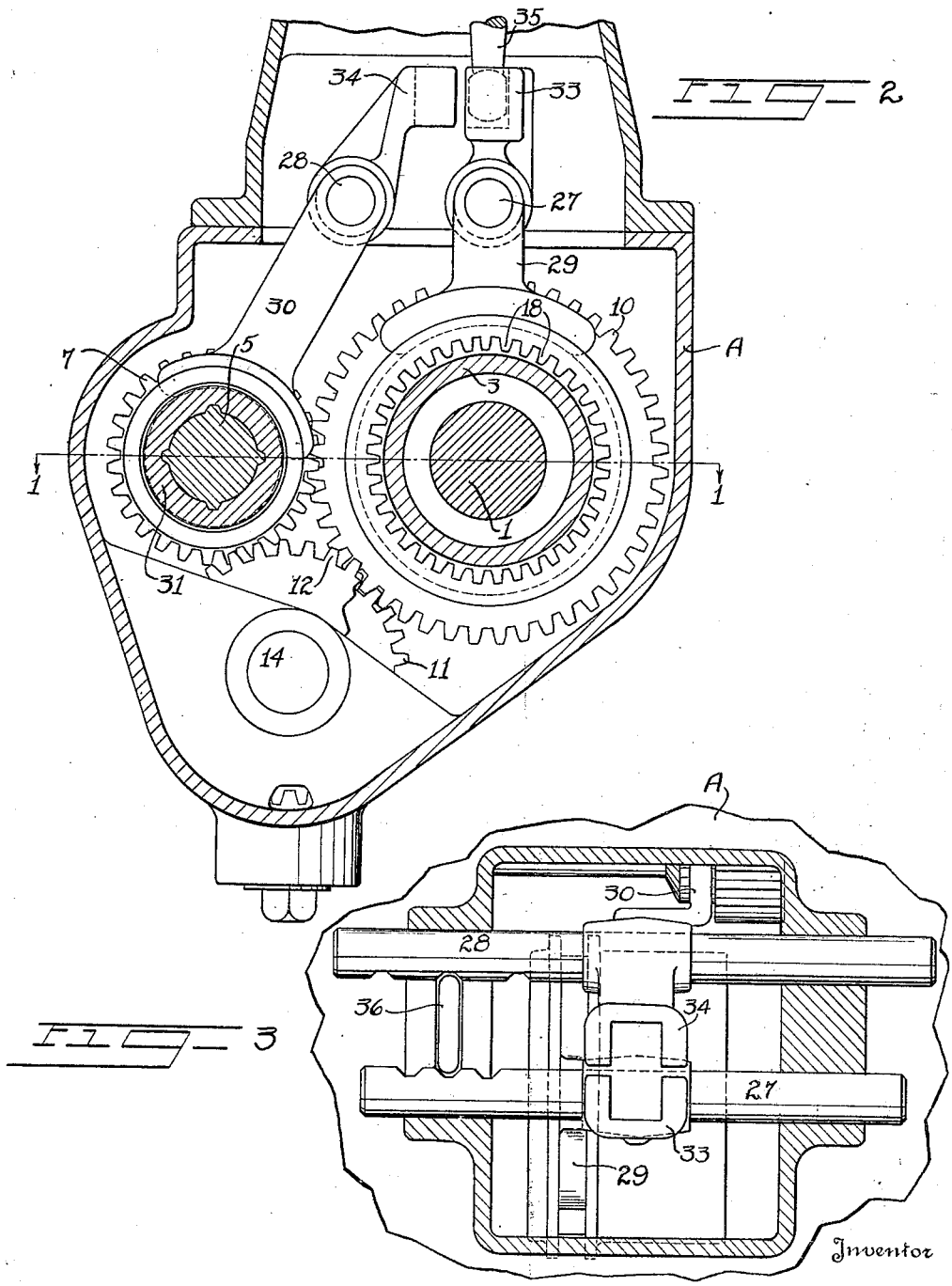

1,880,228

UNITED STATES PATENT OFFICE

CHARLES E. F. AHLM, OF EAST CLEVELAND, OHIO, ASSIGNOR, BY MESNE ASSIGNMENTS, TO AUTOMOTIVE RESEARCH CORPORATION, OF WARREN, OHIO, A CORPORATION OF DELAWARE

TRANSMISSION GEARING

Application filed December 9, 1926. Serial No. 153,544.

This invention relates to change speed transmission gearing for motor vehicles. The primary object is to provide a simple compact unitary gearing for obtaining three or more forward speeds, at least two of which speeds will be comparatively quiet as contrasted with the ratio changes afforded by change speed gearing units now generally employed which have only one quiet speed, namely, high or direct drive.

A further object is to provide a gearing employing an internal-external gear train and an external spur gear train, both of which trains are compactly arranged and which may be conveniently controlled from a single operating member, such as a shift lever.

Further objects include the provision of an automobile gearing, such as outlined in the next preceding paragraph, in which certain elements of the spur gear train may be completely disconnected from both the engine and propeller shaft to thereby further reduce noise and/or power loss.

A still further object is to provide a gearing unit employing an internal-external gear train and an external spur gear train, in which both trains are arranged to bridge across the same two power shafts, whereby there may be but one break (for neutral) in the power line from one end of the unit to the other.

The various novel features and the advantages of the invention are hereinafter more fully explained in the following detailed description relating to the accompanying drawings wherein the preferred embodiment is illustrated. The essential characteristics are summarized in the claims.

In the drawings Fig. 1 is a central horizontal cross sectional view through the gearing; Fig. 2 is a fragmentary transverse sectional view taken along the line 2—2 on Fig. 1; Fig. 3 is a horizontal sectional plan showing the control bar arrangement for selectively controlling the two gear trains.

The gearing as shown comprises a casing A carrying two axially aligned shafts 1 and 2 in abutting relation, an internal-external gear train B and an external spur gear train C. The train B comprises a hollow gear member 3 coaxial wih the drive shaft 1 and surrounding it, the member 3 being connected to this shaft through an eccentric sleeve 4 internally and externally geared with the drive shaft by reason of gear teeth P and P' and similarly geared to the gear member 3 by reason of teeth P2 and P3, maintained on a fixed eccentric axis by bearings 4a carried by the casing. The arrangement of elements of the gear train B is more fully set forth in my Patent No. 1,758,386, issued May 13, 1930, and my application, Ser. No. 69,762 filed Nov. 18, 1925, in which applications the quietness of operation of such an arrangement is explained more in detail.

The gear train C comprises a counter shaft 5 slidably carrying two external mutually rigid gears 6 and 7 the former meshing with either of two sets of external teeth 8 and 9 on the hollow gear member 3. The other gear, 7, meshes with a gear 10 on the driven shaft 2, and both gears 6 and 7 are simultaneously movable entirely out of mesh with the cooperating gears.

Reverse drive is had, as shown when the gears 6 and 7 are in their forward position by means of mutually rigid idler gears 11 and 12 cooperating with the gear 10 on the driven shaft and the gear 7 respectively. The idler gears are supported on a lay shaft 14 and the gears 10 and 11 are in constant mesh.

A single clutch sleeve 15 is employed for connecting and disconnecting the shafts for direct drive and neutral as well as for connecting the shafts through the internal-external gear train only. The sleeve 15 is shown as splined onto the shaft 2 at 16 and has internal teeth 18 engageable with the rearward ends of the external teeth 9 on the gear member 3 and with external clutch teeth 20 rigid with the shaft 1. The shafts are entirely disconnected when the teeth 18 are positioned between the teeth 9 and 20.

The control means for both gear trains comprises, as shown, parallel slide bars 27 and 28 mounted in the casing as shown in Fig. 3, the bar 27 having rigid therewith a shifting fork 29 engaging a peripheral groove in the clutch sleeve 15, and the bar 28 having a similar fork 30 engaging a peripheral groove in the hollow elongated hub 31 for the mutually rigid gears 6 and 7. The shifting forks have upwardly extending heads respectively designated 33 and 34 engageable by the lower end of a shift lever 35 pivoted above the casing in the usual manner (not shown). Any suitable means may be utilized to hold the bars 27 and 28 in their shifted positions. A locking dog 36 is shown in Fig. 3, arranged to enter notches in the slide bars to prevent more than one bar being shifted at a time.

The speeds obtainable by the gearing as illustrated, with gear ratios approximately as shown, are as follows: When the sleeve 15 is shifted rearwardly from the neutral position shown, one shaft drives the other directly, this being the high speed. When the sleeve is shifted forwardly from the position shown, the quietly operating second speed is obtained by reason the sleeve 4 being driven at a reduced speed through teeth P and P' and the hollow gear member 3 being driven at a still slower speed through the teeth P2 and P3. The third forward speed (low) is obtained when the gears 6 and 7 are shifted rearwardly so that the teeth 6—9 and 7—10 engage, and a low reverse speed is obtained when the gears 6 and 7 are shifted forwardly so that the gears 6—8 and 7—12 engage.

It will be seen that the two gear trains, B and C, described above, constitute a duplex internal set of gears (two internal-external couples, P—P1 and P2—P3), together with a multiple speed reduction gearing of substantially the usual spur gear type.

In the arrangement shown, I obtain a low third speed while using the reduction through the gear train B, driving the counter shaft gears from the hollow gear member 3. However, the counter shaft gear, such as 6, could be arranged to connect with the shaft 1 by reason of providing external teeth on the sleeve 4 or a separate set of external teeth on the shaft 1.

From the above description in connection with the accompanying drawings, it will be seen that the gearing has a number of distinctive advantages, the more important being summarized below. Both the internal-external gear system and the external spur gear system bridge the same pair of shafts constituting the main driving and driven elements of the unit. One result of this is that the gearing may be effectively controlled by a single control element such as a lever with the conventional forms of shift bars, and with substantially no modification of such lever and shift bars from standard practice. Further, only one oil supply is needed for the two systems.

In an automobile change speed transmission, it is of course necessary to provide for entirely disconnecting the main drive shaft from the main driven shaft; in other words, to provide for neutral when changing from one driving ratio to another. Now heretofore, where an internal gear system on the order of that shown, operated, to afford a quiet speed, in conjunction with substantially conventional types of spur gears, for acceleration and reverse, it was found necessary to break the power line in two places, once for the internal gear system and once for the spur gear system. If more than one neutral provision is present, the car is of course more likely to get out of control in the hands of an inexperienced driver. With the present arrangement, only one break in the power line for neutral is necessary, wherefore the present unit may be more effectively controlled, may be more economically manufactured, and is more compact, particularly shorter, than the previous arrangements of its class.

A further advantage may be noted in connection with Fig. 1 wherein it will be seen that one of the gear systems has certain of its elements so arranged that these elements may be entirely disconnected from both the driving and driven shafts at the same time, for one speed condition, thereby saving considerable power, and eliminating considerable gear noise.

A further specific advantage obtains, in the embodiment illustrated, namely that the reduction afforded by the internal gearing, supplements, or operates in addition to, the reduction afforded by the spur gears, wherefore the spur gearing may be made somewhat more compact (less tooth differences per each gear couple) to afford the desired ratio or ratios for the comparatively low acceleration speed or speeds.

I claim:

1. In a gearing a pair of axially aligned shafts, a casing therefor, a gear train for connecting the shafts, comprising two gears in axial alignment with the shafts, one being drivingly rigid with one of the shafts, and a hollow geared interponent connecting said gears and supported by the casing in eccentric relation to the shafts and surrounding one of them, means for connecting the shafts directly together or through the intermediacy of the gear train, another train comprising two external gears and a common counter shaft therefor in parallel relation to the first named shafts, and two respectively cooperating external gears one for each of the first mentioned shafts, means for establishing and interrupting the connection between the shafts through the intermediacy of said second named gear train, and a common control means for selectively controlling said last named means and said first named means.

2. In a gearing a pair of axially aligned shafts, a casing therefor, a gear train for connecting the shafts comprising two hollow members internally and externally geared together, at least one of the members being in surrounding relation to one of the shafts, one being concentric therewith and the other being eccentric thereto and having a geared connection therewith, a clutch means operating in bridging relation to the adjacent ends of said shafts and operable to connect one shaft directly to the other and to the said concentric gear member, and another gear train comprising two external gears and a common counter shaft therefor in parallel relation to the first named shafts, and two respectively cooperating external gears one for each first mentioned shaft, one of the said external gears being slidable into and out of mesh with its cooperating gear to establish and interrupt the driving connection between the shafts through said second named gear train.

3. In a gearing, a pair of axially aligned shafts, a casing therefor, a gear train comprising a gear constantly connected to one shaft, and two hollow members internally and externally geared together and geared to said first named gear, at least one of the members surrounding one of the shafts, one being in concentric relation therewith and the other eccentric thereto, a clutch means operating in bridging relation to the adjacent ends of said shafts and operable to connect the shafts directly together, to connect them through the intermediacy of the gear train and to disconnect them entirely, and another gear train comprising external gears and a common counter shaft therefor in parallel relation to the first named shafts, each having a geared connection with a respective one of said aligned shafts, means to establish and interrupt the driving connection between the shafts through said second named gear train, and a common control for the last named means and said clutch means.

4. In a gearing a casing, a pair of shafts carried thereby in axial alignment and substantially abutting relation, a gear train comprising two hollow interconnected gear members, one being coaxial with the shafts and the other being in fixed eccentric relation thereto, the eccentric gear member surrounding one of the shafts and having an internal and external geared connection with this shaft, clutch means operating in bridging relation to the adjacent ends of said shafts and selectively operable to connect the shafts directly together and through the intermediacy of the gear train, another gear train for connecting the shafts comprising a countershaft carried by the casing in parallel relation to the first mentioned shafts, and two external drivingly rigid gears carried by the countershaft, one being in mesh with teeth on one of the hollow gear members, the other having a geared connection with one of the first mentioned shafts, means to establish and interrupt the connection between the shafts through the second named gear train and a common selective control for the clutch means and the last named means.

5. In a gearing, a pair of axially aligned shafts, a casing therefor, two hollow interconnected gear members supported by the casing at least one being in surrounding relation to one of the shafts, one of the gear members being coaxial with this shaft and the other being eccentric thereto, the eccentric gear having a permanent internal and external geared connection with the shaft, a clutch member in splined relation to one of the shafts and arranged to connect the shafts directly together when in one position and to connect the shafts through the hollow gears when in another, a gear train comprising two external gears drivingly rigid with one of the first named shafts and one of the hollow gear members respectively, a counter shaft and two external gears each being drivingly rigid on the counter shaft, one cooperating with each of said first mentioned external gears, one of the latter two gears being relatively slidable into and out of mesh with its cooperating external gear, and a common means for controlling the position of the slidable gear and said clutch member.

6. In a gearing a casing, a pair of axially aligned shafts carried thereby, a gear train for connecting the shafts, comprising two coaxial gears, one for each shaft and a hollow geared interponent connecting the said coaxial gears, said interponent having its axis of rotation in fixed eccentric relation to the said gears, clutch means for connecting the shafts directly and for connecting the shafts through the intermediacy of the gear train, another gear train comprising two external coaxial gears each having a driving connection with a respective shaft, a countershaft and a pair of drivingly rigid external gears carried thereby, each cooperable with a respective previously mentioned external gear, one of the external gears being slidable into and out of mesh with its cooperating external gear.

7. In a gearing, a pair of axially aligned shafts, a casing therefor, a gear train for connecting the shafts, comprising a gear drivingly rigid with one of the shafts, a gear member coaxial with the shaft and rotatable relative thereto, a hollow geared interponent for connecting the gear and gear member, said interponent having its axis of rotation eccentric to said gear and gear member, clutch means operable when in one position to connect the adjacent ends of the shafts directly together and when in another position to connect one of the shafts to the said coaxial gear member, another gear train comprising an external gear rigid with the said coaxial gear member, a counter shaft and a gear thereon in mesh with the said external gear, another gear on the counter shaft, and a cooperating external gear on one of the first mentioned shafts, one of the gears in the second named gear train being relatively slidable into and out of mesh with its cooperating gear, and means for selectively controlling the said clutch means and the position of the slidable external gear.

8. In a gearing, a pair of axially aligned shafts, a casing therefor, a gear train for connecting the shafts comprising two gears and a hollow geared interponent connecting said gears and supported by the casing in fixed eccentric relation to the shafts and surrounding one of them, clutch means for connecting the shafts through the gear train and for connecting the shafts directly together, another gear train comprising a counter shaft and a pair of external gears carried thereby each having a geared connection with a respective first mentioned shaft, means whereby the shafts may be connected and disconnected through the second named gear train including a slidable element in the second named train, a reversing gear interposed between the counter-shaft and one of said first mentioned shafts and means for rendering the reversing gear active to connect the shafts and inactive.

9. In a gearing a casing, a pair of axially aligned shafts carried thereby, a gear train for connecting the shafts, comprising a gear rigid on one of the shafts, a gear member coaxial with the other but rotatable relative thereto, and a hollow geared interponent connecting the said gear and gear member, said interponent being mounted in the casing on a fixed axis eccentric to the shafts, clutch means for connecting the shafts directly and for connecting one of the shafts to said gear member, another gear train arranged to connect the shafts comprising a countershaft, two sets of mutually rigid external gear teeth carried thereby, external gears respectively cooperable therewith, one being rigid with the said gear member, the other drivingly connected with one of the shafts, and means for sliding the mutually rigid gear teeth out of mesh with the said cooperable gears.

10. In a gearing a pair of aligned shafts, a casing therefor, means for connecting the shafts directly together, a gear train comprising a gear rigid with one shaft, a hollow gear coaxial with and connectable to the other and surrounding one of the shafts, a hollow geared interponent rotatable on a fixed axis with relation to the casing and eccentric to the said gear and gear member for connecting the last mentioned gear elements, another gear train comprising an external gear rigid with one shaft and an external gear drivingly connected to the other and a pair of mutually rigid external gears and a countershaft on which the last named gears are slidable, said mutually rigid gears connecting the first named shafts when in one position and being completely disconnected from both when in another.

11. In a gearing, a pair of axially aligned shafts, a casing therefor, a gear train for connecting the shafts, comprising a gear drivingly rigid with one of the shafts, a gear member coaxial with the shaft and rotatable relative thereto, a hollow geared interponent for connecting the gear and gear member, said interponent having its axis of rotation in fixed eccentric relation to said gear and gear member, means for connecting the adjacent ends of the shafts directly together when in one position and for connecting one of the shafts to the said gear member when in another, another gear train comprising two external gears, one being rigid with one of said shafts and the other rigid with the said gear member, a countershaft and two mutually rigid gears mounted thereon, one for each first mentioned external gear, a reversing idler gear member and a countershaft therefor, said idler being in mesh with the said external gear rigid with one shaft, said mutually rigid gears being shiftable to one position to connect the first named shafts through the idler gear member and both said gear trains, to another to connect the shafts through both gear trains exclusive of the idler, and to still another to be entirely free from connection with both of said first named shafts.

12. In a gearing two shafts to be connected in different speed relations, two gear trains arranged to connect the shafts each for a different speed relation, one train comprising two gears coaxial with the respective shafts, one for each shaft, a hollow compound geared interponent eccentrically mounted on a fixed axis and connecting the said two gears and means for rendering the train operative and idle, the other gear train comprising two gears each being coaxial with a respective shaft, a countershaft rigidly mounted in parallel relation to the first named shafts and a pair of drivingly rigid gears mounted thereon one for each last mentioned gears respectively, means for rendering the said other gear train drivingly operative and idle, one of said means including a slidable element in the respective gear train so arranged that both shafts may be entirely disconnected from the intermediate elements of this train when the other train is drivingly operative.

13. In a gearing a casing, a pair of axially aligned shafts carried thereby, means for connecting the shafts for direct drive and disconnecting them for neutral, a gear train for connecting the shafts comprising two gears, one for each shaft and coaxial therewith, and a hollow geared interponent eccentrically mounted on a fixed axis and surrounding one of the shafts for connecting the two gears, means for rendering the train drivingly active and idle, another gear train for connecting the shafts comprising two gears, one for each shaft and coaxial therewith and a geared interponent for connecting the last two mentioned gears mounted on a countershaft supported in the casing in parallel relation to the two first mentioned shafts, means for rendering the second named gear train drivingly active and idle, there being a common control means for all of said previously mentioned means.

14. In a gearing a casing, a pair of shafts carried thereby, a gear train for connecting the shafts for one speed comprising two gears one for each shaft and coaxial therewith, a hollow geared interponent eccentrically mounted on a fixed axis and surrounding one of the shafts for connecting the two gears, means for rendering the train drivingly active and idle, another gear train for connecting the shafts comprising two gears, one for each shaft and coaxial therewith, a geared interponent mounted on a countershaft supported in the casing in parallel relation to the two first mentioned shafts, means for rendering the second named gear train drivingly active and idle one of said interponents being axially movable to such position that it is entirely disconnected from both its cooperating gears when the other interponent is drivingly active.

15. In an automobile gearing, a housing, a pair of main shafts supported for relative rotation in the housing, a gear train comprising a plurality of internally and externally meshing gears mounted for rotation on relatively eccentric axes fixed with relation to the housing, and cooperating means to positively drivingly associate said gears with both shafts to connect the same for a quiet speed, and an external spur gear train arranged in the housing and comprising a countershaft and external spur gears thereon and cooperating spur gears permanently drivingly associated respectively with the said main shafts for cooperation with respective said countershaft gears, and means to render the countershaft train drivingly active and idle.

16. An automobile variable speed transmission unit comprising, a main driving and a main driven shaft, casing means therefor supporting the shafts, means to positively drivingly associate the shafts for a quiet speed, comprising an internal-external gear train, the elements where of rotate on permanently fixed axes, and means to connect the shafts for low and reverse speeds, said last named means including a countershaft and gears thereon, gears permanently drivingly associated with respective said shafts and adapted to mesh with respective countershaft gears, and an idler gear disposed between one of said main shaft gears and one of said countershaft gears.

17. In an automobile gearing, a housing, a pair of main shafts supported in the housing on fixed axes of rotation, a gear train comprising internally and externally meshing gears mounted in the housing and constrained to rotate on fixed axes for positively connecting the mainshafts for a quiet speed, said gears being arranged to connect the shafts, one of said gears being permanently drivingly connected to one of said shafts, and there being means to render said train active and idle, an external spur gear train arranged in the housing and comprising a countershaft and external spur gears thereon, and cooperating spur gears drivingly associated respectively with the said main shafts for cooperation with respective said countershaft gears one of said cooperating spur gears being permanently drivingly connected to the same shaft which is permanently coupled with one of the internally and externally meshing gears, and means to render the countershaft train drivingly active and idle.

18. In an automobile gearing, a casing, a pair of shafts supported in coaxial relation by the casing and means to couple the shafts in one to one ratio for direct drive, an internal-external gear train including a compound gear in fixed eccentric relation to one of said shafts and means to support the same for rotation on a fixed axis, means positioned by the aforesaid coupling means for establishing a driving connection between the shafts through the intermediacy of said gear train whereby a quiet geared connection is obtained between the shafts in addition to the direct drive, and a countershaft gear train, including a countershaft and spur gears arranged thereon and cooperating gears respectively and permanently drivingly associated with the said main shafts for driving one shaft from the other at greater relative speed than that afforded by the internal-external train.

19. In an automobile gearing, a casing, a driving and a driven shaft extending thereinto and supported by the casing, an internal-external gear system arranged to bridge and drivingly associate the said shafts for a quiet driving speed, and an external spur gear system arranged to bridge and drivingly associate the shafts for lower driving speeds, the spur gear system being characterized by the fact that certain elements thereof are arranged to be entirely disassociated from both the driving and driven shafts during one operative condition of the gearing.

20. In a gearing, a casing, a pair of axially aligned shafts carried thereby, a gear train comprising two hollow interconnected gear members, one being coaxial with the shafts and the other in fixed eccentric relation thereto and having an internal and external geared connection with one of the shafts, means including a clutch for connecting the shafts directly together and through the medium of the said hollow gears, another gear train for connecting the shafts comprising a counter-shaft carried by the casing in parallel relation to the first mentioned shafts and two external drivingly rigid gears carried by the counter-shaft, there being external gear teeth on one of said hollow members adapted to mesh with one of said counter-shaft gears for coupling the counter-shaft with one of the first mentioned shafts, and a gear on the other of said first mentioned shafts adapted for cooperation with the other of said counter-shaft gears, and means to render the counter-shaft train drivingly active and idle.

In testimony whereof, I hereunto affix my signature.

CHARLES E. F. AHLM.